(12) United States Patent
Shah et al.

(10) Patent No.: US 11,592,369 B2
(45) Date of Patent: Feb. 28, 2023

(54) HISTOLOGY BATH AND SLIDE WARMING SYSTEM

(71) Applicant: Rushabh Instruments, LLC, Ivyland, PA (US)

(72) Inventors: Preyas Shah, Furlong, PA (US); Sahil Shah, Furlong, PA (US); Joseph Lessard, Horsham, PA (US); Alyicia Marie Rios, Downey, CA (US); Joshua T. Greenlee, Laveen, AZ (US); Olivia Grabowski, Los Angeles, CA (US)

(73) Assignee: Rushabh Instruments, LLC, Ivyland, PA (US)

(*) Notice: Subject to any disclaimer, the term of this patent is extended or adjusted under 35 U.S.C. 154(b) by 87 days.

(21) Appl. No.: 17/316,123

(22) Filed: May 10, 2021

(65) Prior Publication Data

US 2022/0357247 A1    Nov. 10, 2022

(51) Int. Cl.
| | |
|---|---|
| G01N 1/00 | (2006.01) |
| G01N 1/31 | (2006.01) |
| G02B 21/34 | (2006.01) |
| B01L 9/00 | (2006.01) |
| G01N 1/44 | (2006.01) |
| B01L 7/02 | (2006.01) |

(52) U.S. Cl.
CPC ............ *G01N 1/312* (2013.01); *B01L 7/02* (2013.01); *B01L 9/52* (2013.01); *G01N 1/44* (2013.01); *G02B 21/34* (2013.01); *G01N 2001/315* (2013.01)

(58) Field of Classification Search
None
See application file for complete search history.

(56) References Cited

U.S. PATENT DOCUMENTS

2001/0019703 A1*  9/2001  Thiem ............... G01N 1/312
                                                         422/63

OTHER PUBLICATIONS

Facebook Posting for TIssueTek Water Bath and Slide Dryer, 2021, downloaded from https://www.facebook.com/photo?fbid=10227734669219106&set=gm.10158247074350488, 2 pages.

* cited by examiner

*Primary Examiner* — Jyoti Nagpaul
(74) *Attorney, Agent, or Firm* — RatnerPrestia

(57) ABSTRACT

A tissue processing station includes a housing and a first heated plate that is either disposed on or forms a first horizontally oriented surface of the housing. The first heated plate is configured to either (i) contain water, or (ii) receive a dish containing water. The tissue processing station may also include a vertically-oriented heated well for heating slides. A second heated plate is either disposed on or forms an angled surface of the housing for supporting one or more laboratory slides. The angled surface is angled relative to the first horizontally oriented surface. A third heated plate is either disposed on or forms a second horizontally oriented surface of the housing for supporting one or more laboratory slides. The first and second horizontally oriented surfaces are defined at different elevations on the housing. The angled surface extends between the two horizontally oriented surfaces.

19 Claims, 5 Drawing Sheets

HISTOLOGY BATH AND SLIDE WARMING SYSTEM

FIELD OF THE INVENTION

The present invention relates to a histology water bath and slide warming system.

BACKGROUND OF THE INVENTION

A water bath is used in histology labs to relax thinly cut paraffin embedded sections before the sections are mounted on a glass slide for staining. A typical water bath comprises either a built-in pan or removable glass dish that is configured to hold water and be heated to a desired temperature. A water bath may include a light to illuminate the tissue sections for enhanced visibility.

The devices described hereinafter may be used along with a water bath.

A horizontal heating plate (also referred to as a slide heater), which can be used along with a water bath in tissue processing, may be a metal plate that is typically heated to about 40 C. for drying a tissue mounted slide. Another horizontal heating plate (also referred to as a tissue orienter), which can also be used along with a water bath in tissue processing, is a metal plate or a block that is typically heated to about 65 C. and is used to heat paraffin embedded tissue and remove any curls or wrinkles in the tissue that were not relaxed prior to mounting the tissue on the slide. After cutting the tissue and mounting the tissue on a slide, the slide is ready to be stained.

The slide is then loaded in a slide rack or a slide basket and then placed on a stainer that has built-in heater. Alternatively, the slide may be heated in a separate oven. The first step in slide staining is the removal of paraffin from the tissue. Heating the slides to about 60 C. or greater will melt the paraffin from the tissue before the slide is placed in xylene or a xylene substitute to completely remove the paraffin.

It would be desirable to combine the water bath, slide heater, tissue orienter and/or slide basket heater into one unit to improve the throughput of the staining process by pre-warming the slides while they are being prepared and organized in the slide basket.

SUMMARY OF THE INVENTION

According to one aspect, a tissue processing station includes a housing. A first heated plate is either disposed on or forms a first horizontally oriented surface of the housing. The first heated plate is configured to either (i) contain water (or other liquid), or (ii) receive a dish containing water. A second heated plate is either disposed on or forms an angled surface of the housing for supporting one or more laboratory slides. The angled surface is angled relative to the first horizontally oriented surface. A third heated plate is either disposed on or forms a second horizontally oriented surface of the housing for supporting one or more laboratory slides. The first and second horizontally oriented surfaces are defined at different elevations on the housing. The angled surface extends between the two horizontally oriented surfaces.

According to another aspect, a tissue processing station includes a housing and a first heated plate that is either disposed on or forms a first horizontally oriented surface of the housing. The first heated plate is configured to either (i) contain water, or (ii) receive a dish containing water. A slide basket heater is positioned within an opening that is disposed on the first or a second horizontally oriented surface of the housing for supporting one or more laboratory slides. The slide basket heater contains a vertically extending cavity for receiving a plurality of vertically oriented slides, and one or more heating elements for heating the cavity.

BRIEF DESCRIPTION OF THE DRAWINGS

The invention is best understood from the following detailed description when read in connection with the accompanying drawings. It is emphasized that, according to common practice, the various features of the drawings are shown schematically and may not be to scale. Included in the drawings are the following figures:

FIGS. 2B and 2C depict front and rear isometric views, FIG. 2D depicts a top plan view, and FIG. 2E depicts a cross-sectional view of the main unit of FIG. 2D taken along the lines 2E-2E.

DETAILED DESCRIPTION OF THE INVENTION

Figure 1:
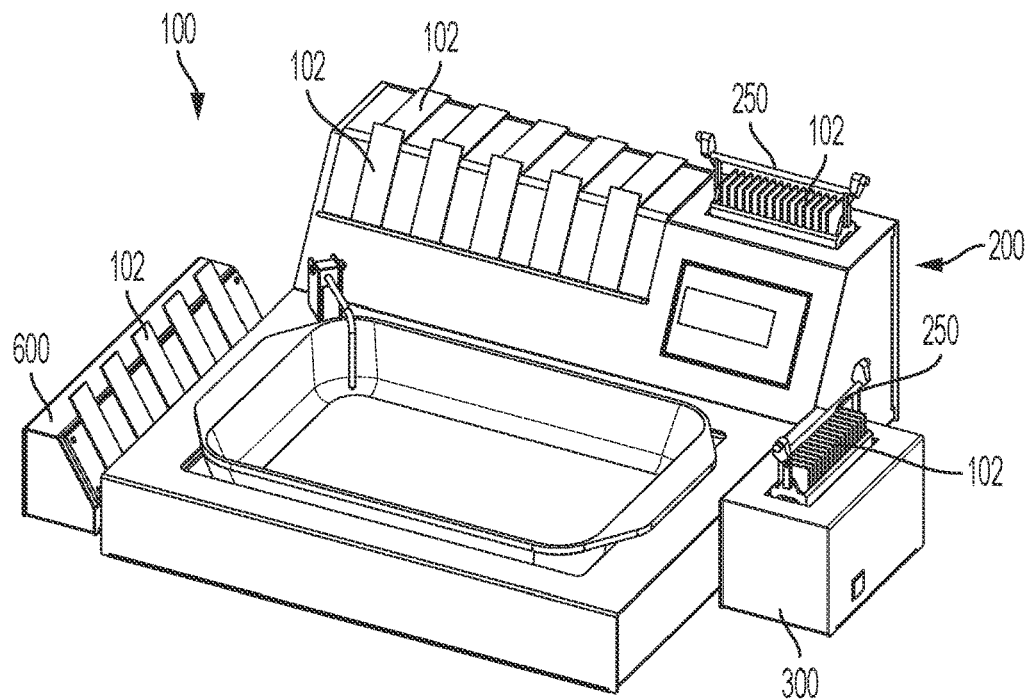
FIG. 1 depicts an isometric view of a slide processing station including a main unit with a built-in slide heating system and accessories therefor.

The invention will next be illustrated with reference to the figures. Such figures are intended to be illustrative rather than limiting and are included herewith to facilitate explanation of the present invention. In the drawing figures, like item numbers refer to like elements throughout. When a plurality of similar elements are present, a single reference numeral may be assigned to the plurality of similar elements with a capital letter designation referring to specific elements. When referring to the elements collectively or to a non-specific element, the letter designation may be omitted.

In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Figure 2A:
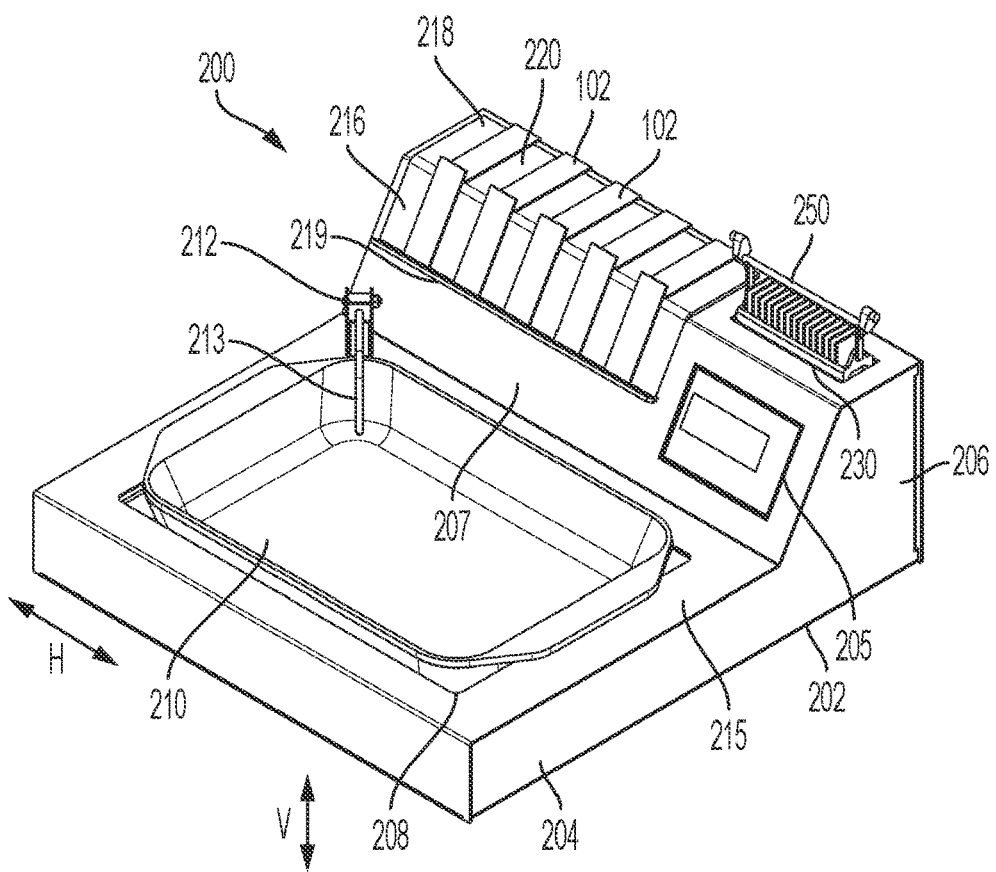
FIG. 2A depicts an isometric view of the main unit of FIG. 1, according to a first exemplary embodiment.
Figure 2B:
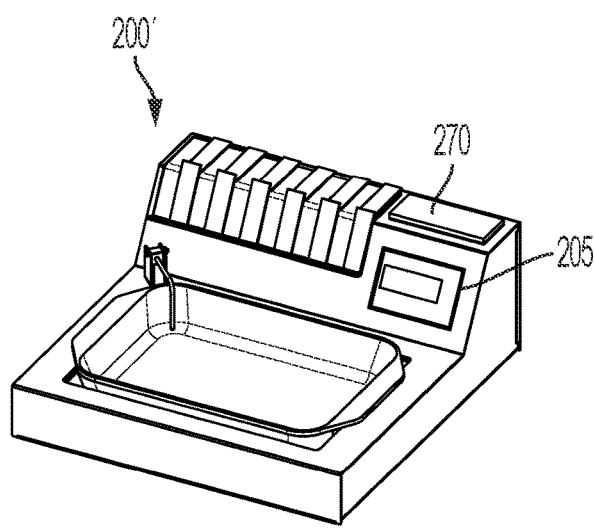
FIGS. 2B-2E depict an alternative main unit according to a second exemplary embodiment. Specifically.

The vertical direction is given by arrows V in FIG. 2A, and the horizontal direction is given by arrows H in FIG. 2A.

FIG. 1 depicts an isometric view of a slide processing station 100 including a main unit 200 with a built-in slide heating system and accessories therefor including a slide basket heater 300 and a slide heater 600. Station 100 may serve the following functions: relaxing tissues in a dish, orienting tissues on glass slides, as well as removing excess moisture and/or melting paraffin from the tissue and slides.

Station 100 may comprise main unit 200, slide basket heater 300 and slide heater 600. Alternatively, station 100 may comprise (only) main unit 200 and its associated built-in components.

The first embodiment of the main unit 200 will be described hereinafter, however, it is noted that the first and second embodiments include many of the same components, thus, the components of the second embodiment in FIGS. 2B-2E that are described hereinafter are also applicable to the first embodiment shown FIG. 2A (unless noted otherwise).

Turning now to FIG. 2A, main unit 200 includes a hollow enclosure or housing 202. Housing 202 is monolithic and may include a single unitary component, such as a molded component. Alternatively, housing 202 may be composed of multiple plates or panels that are fixedly interconnected together. Housing 202 generally comprises a rectangular portion 204 and a right-trapezoidal portion 206 that is positioned on one side of the rectangular portion 204 and at an elevation above the rectangular portion 204.

The rectangular portion 204 of the housing 202 has a rectangular opening 208 formed on a top horizontally oriented surface 215 thereof. The rectangular opening 208 is sized to receive a rectangular dish 210 for holding water or other fluid. Thus, main unit 200 may be considered to include a water bath.

Figure 2C:
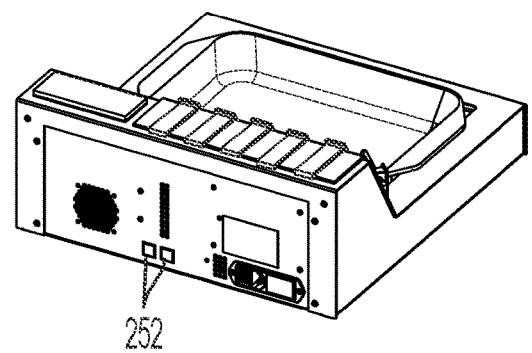
Figure 2D:
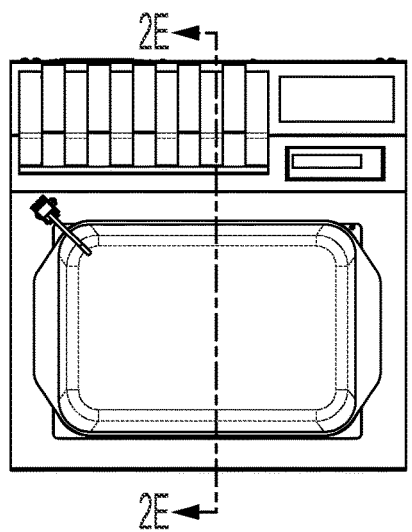
Figure 2E:
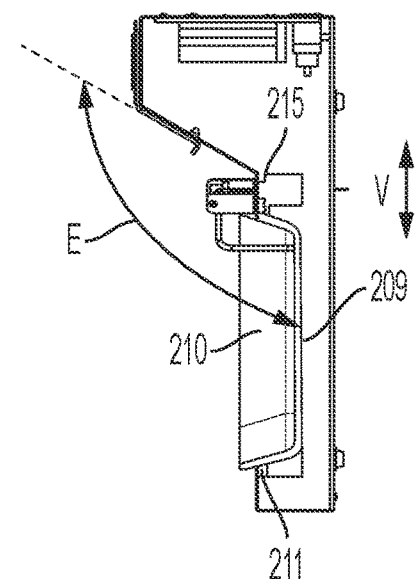

As shown in FIG. 2E, heated plate 209 (or heating tray) comprising one or more heating elements is defined on the bottom end face of opening 208 for heating the bottom surface of dish 210 along with its contents. Main unit 200 includes circuitry for operating (i.e., activating, metering and deactivating) the heating elements. Alternatively, in lieu of using a separate dish 210, opening 208 may constitute a dish itself for holding water or other fluid. Alternatively, it is envisioned that the heated plate 209 could be positioned on or form part of the surface 215 of housing 202, and opening 208 may be omitted.

A circuit board 211 comprising one or more LED lights (for example) is positioned within the opening 208. LED lights are employed to illuminate the dish 210 and its contents.

Turning back to FIG. 2A, a temperature sensor probe 212 is mounted to housing 202 at a location adjacent dish 210. Probe 212 includes an angled and extended portion 213 that is positioned to extend over and into the dish 210 for sensing the temperature of the contents within dish 210. Main unit 200 includes circuitry for operating (i.e., activating, deactivating and/or communicating with) temperature sensor probe 212.

The trapezoidal portion 206 of the housing includes an angled wall 207. As best shown in FIG. 2E, an obtuse angle 'E' is defined between the angled wall 207 of the housing 202 and the planar horizontal surface 215 upon which the opening 208 is defined.

A user interface 205 comprising a keypad, buttons and/or a display is disposed on the angled wall 207 of trapezoidal portion 206. User interface 205 is configured for receiving commands and information input by an end user or operator of the station 100. The user interface 205 is connected to an internal computer including a power supply, a processor and a controller for operating the station 100. The computer is electrically connected to the sensors and heating elements of the main unit 200 that are described herein. The computer is also electrically connected to the accessories (i.e., slide basket heater 300 and a slide heater 600), which are described herein, to send electrical power to those accessories as well as send/receive signals to/from those accessories. The terms accessories and auxiliary units are used interchangeably herein. The computer is connected to all of the heaters and heated surfaces, including those in the auxiliary units, such that the computer can independently operate all of the heaters and heated surfaces at different temperatures, if so desired by the operator of the system.

The angled and front facing wall 207 also includes a rectangular heating plate 216. The rectangular heating plate 216 includes one or more heating elements or other means for heating the surface. A protruding and horizontally extending lip 219 is defined at the lower edge of heating plate 216. Lip 219 extends orthogonally (or substantially orthogonally, e.g., 85 degrees) from plate 216. In use, the bottom edge of one or more slides 102 are seated on the lip 219. The angled surface of the heating plate 216 allows water (or other fluid) to run down the slide 102 by gravity, thereby accelerating the slide drying time. The water can collect on lip 219.

Another rectangular heating plate 218 is defined on a portion of the top horizontal surface 220 of the trapezoidal portion 206. The rectangular heating plate 218 also includes one or more heating elements or other means for heating the surface. The heating plates 216 and 218 are positioned adjacent to each other and may abut one another. It should be understood that heating plates 216 and 218 may be combined into a single unit. Heating plates 216 and 218 are built-in and unitized with main unit 200. Alternatively, the heating plates 216 and 218 may be thermally isolated from each other. The temperature of the plates 216 and 218 may be controlled either independently or collectively using the user interface 205.

A built-in and vertically oriented slide basket heater 230 (also referred to herein as a heating well) is also disposed on the top surface 220 of the main unit 200 at a location adjacent heating plate 218. Slide basket heater 230 includes a rectangular shaped recess or cavity that extends in a vertical direction and is disposed in the body of housing 202. Slide basket heater 230 is sized and configured to receive a slide carrier 250. In FIG. 2A, the carrier 250 is shown positioned within the slide basket heater 230. One or more walls of slide basket heater 230 are lined with heating elements or other means for heating. The temperature of the slide basket heater 230 may be controlled using the user interface 205. In use, a slide carrier 250 is stowed in slide basket heater 230 and protrudes about the top surface 220 of housing 202. One or more slides 102 are mounted to slide carrier 250. Slide basket heater 230 may or may not be configured to contain a liquid, such as water or xylene, for example.

Although the slide basket heater 230 is described and shown as being vertically oriented, it should be understood that the slide basket heater 230 may be angled with respect to a vertical axis. For example, an angle of 15 degrees may be defined between the longitudinal axis of the slide basket heater 230 and a vertical axis. As another alternative, the slide basket heater 230 may be oriented horizontally. Also, the top surface 220, to which the slide basket heater 230 is mounted, can also be oriented at an angle with respect to a horizontal axis.

Slide basket heater 230 and user interface 205 are positioned on one side of portion 206 of housing 202, whereas heating plates 216 and 218 are positioned on an opposite side of portion 206 of housing 202. Also, although slide basket heater 230 is positioned on the top surface of main unit 200 it should be understood that slide basket heater 230 may be positioned on the lower horizontal surface 215.

As shown in FIG. 2C, housing 202 further comprises power/signal connections 252 for the (optional) auxiliary units including slide basket heater 300 and slide heater 600. Slide basket heater 300 and slide heater 600 are configured to be connected to connections 252 on housing 202 by cables, for example. Alternatively, connections 252 may be moved to opposite sides of housing 202, and slide basket heater 300 and slide heater 600 may be directly connected to those connections 252 without a cable.

Turning now to the second embodiment of the main unit 200' shown in FIGS. 2B-2E, the features of the main unit 200' are substantially identical to the main unit 200 of FIG. 2A, and only the differences therebetween will be described hereinafter. In place of slide basket heater 230, main unit 200' includes another rectangular heating plate 270, which may also be referred to as a tissue orienter. Plate 270 is defined on a portion of the top surface 220 of the trapezoidal portion 206 at a location adjacent plate 218. The rectangular heating plate 270 may include one or more heating elements or other means for heating the surface. Alternatively, plate 270 may be positioned directly on top of the slide basket heater 230 in order to receive heat from the slide basket heater 230. Laboratory slides 102 are positionable atop plate 270. The temperature of plate 270 may be controlled using user interface 205, as noted previously.

Figure 3:
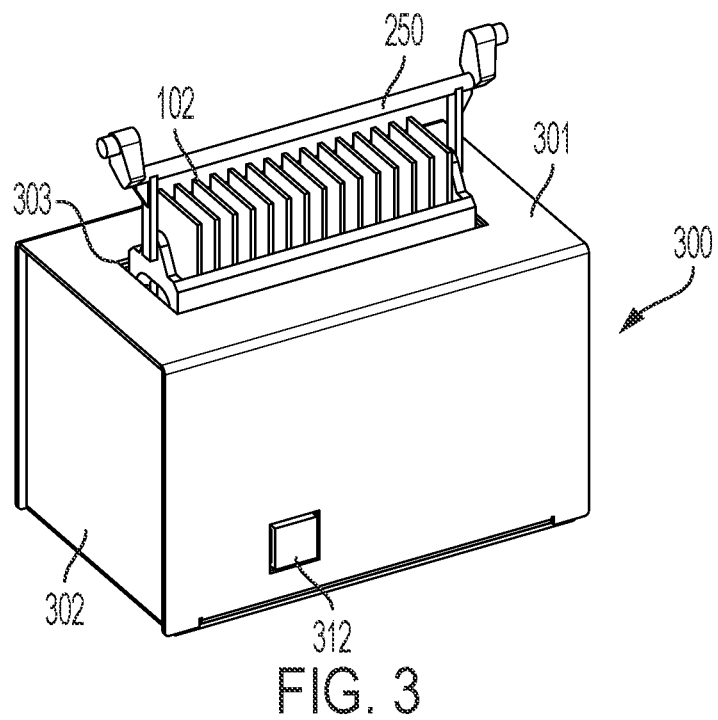
FIG. 3 depicts an isometric view of the slide basket heater accessory component of FIG. 1.
Figure 4:
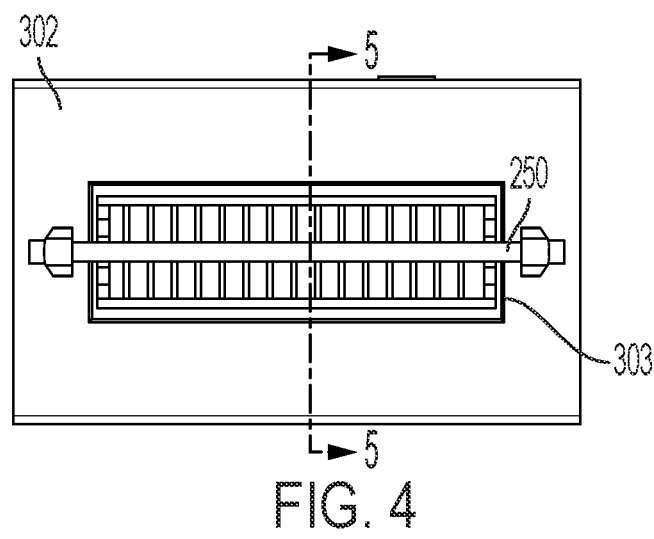
FIG. 4 depicts a top plan view of the slide basket heater accessory component of FIG. 3.
Figure 5:
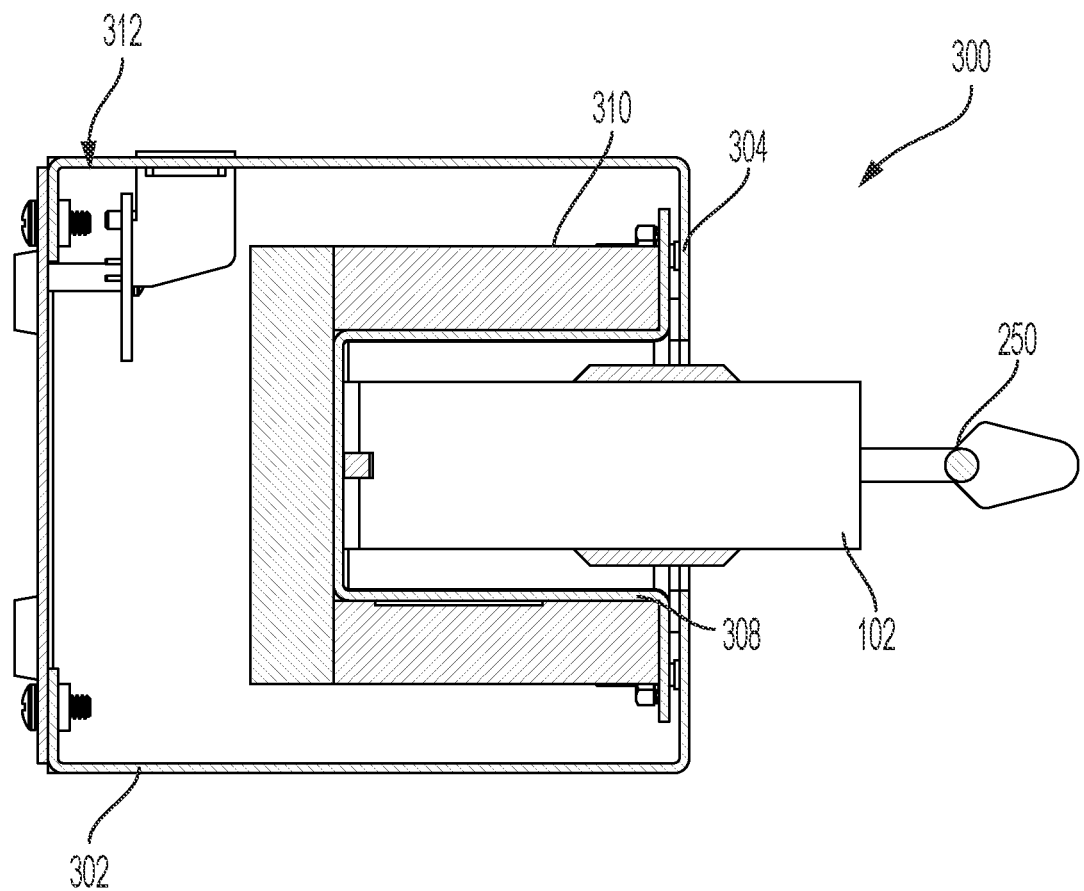
FIG. 5 depicts a cross-sectional view of the slide basket heater accessory component of FIG. 4 taken along the lines 5-5.
Figure 6:
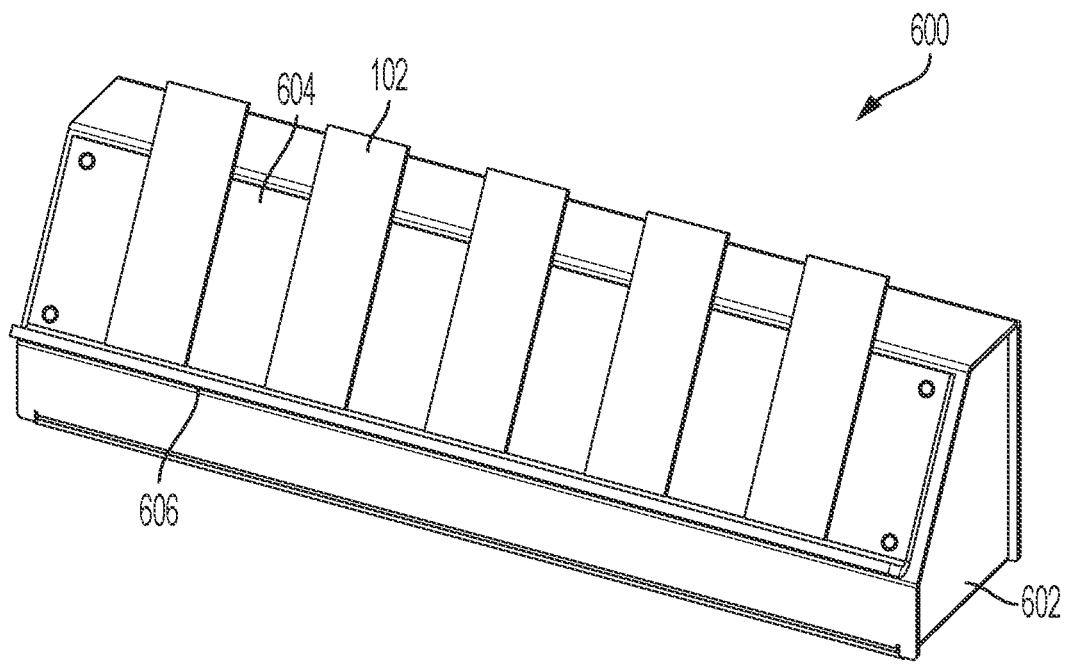
FIG. 6 depicts a front isometric view of the slide heater accessory component of FIG. 1.
Figure 7:
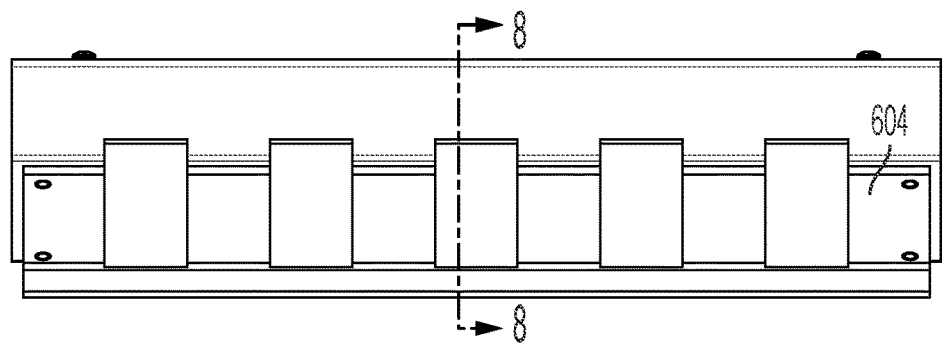
FIG. 7 depicts a top plan view of the slide heater accessory component of FIG. 6.
Figure 8:
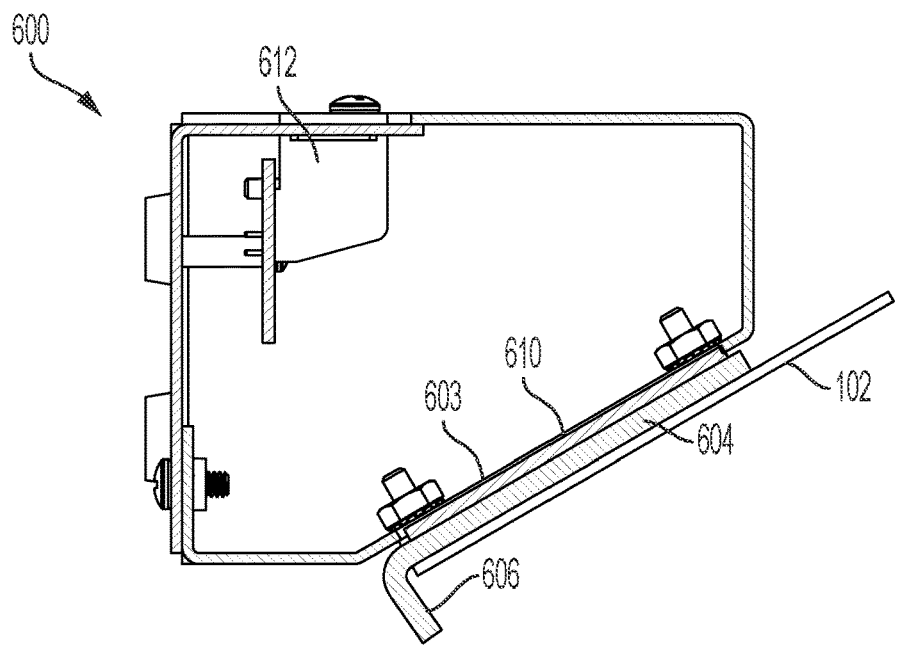
FIG. 8 depicts a cross-sectional view of the slide heater accessory component of FIG. 7 taken along the lines 8-8.
Figure 9:
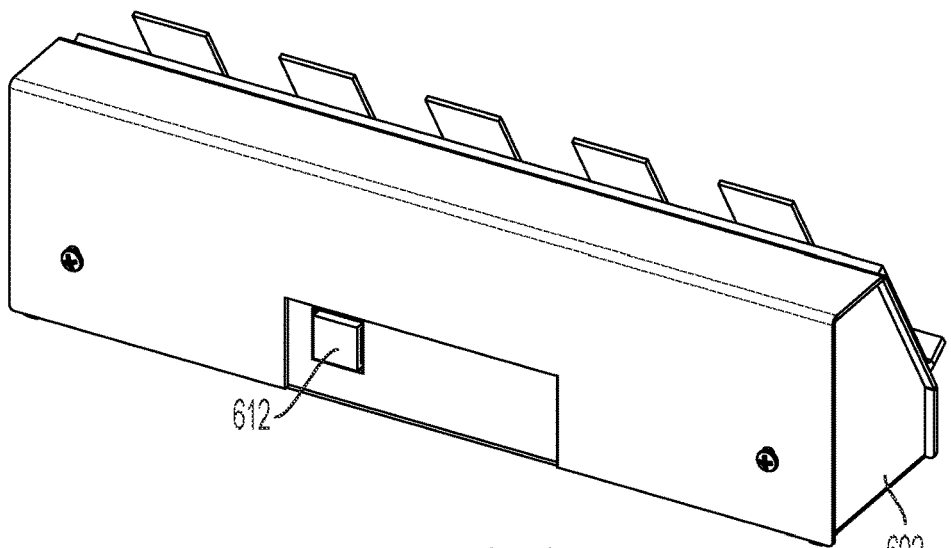
FIG. 9 depicts a rear isometric view of the slide heater accessory component of FIG. 6.

Turning now to FIGS. 3-5, an auxiliary slide basket heater 300 is depicted for use with station 100. Slide basket heater 300 comprises a rectangular housing 302 having an opening 303 at its top wall 301 for receiving and accommodating a slide carrier 250 (like the slide basket heater 230). A heated well 308 is mounted to the housing 302, wherein the opening formed in the slide basket heater registers with the opening 303 formed in the housing 302. One or more walls of well 308 are lined with heating elements or other means. An insulator 304, comprising an insulation material, is sandwiched between the well 308 and the top wall 301 of the housing 302 and positioned about the perimeter of the opening 303. An insulation body 310 is wrapped around the exterior walls of well 308 for insulating the well 308. The temperature of the well 308 may be controlled using the user interface 205. An electrical connection 312 is defined on the wall of the housing 302. Connection 312 is configured to be connected to one of the auxiliary connections 252 on the main unit 200 by a cable or connector, for example, such that the operator and/or computer can control operation of the slide basket heater 300 via the user interface 205. In use, a slide carrier 250 is stowed in well 308 and protrudes about the top surface of housing 302. Well 308 may or may not be configured to contain a liquid, such as water or xylene, for example.

Turning now to FIGS. 6-9, an auxiliary slide heater 600 is depicted for use with station 100. Slide heater 600 includes an elongated body 602 having a right trapezoidal shape (or similar shape), as viewed in cross-section. The angled and front facing wall 603 includes a rectangular heating plate 604. The rectangular heating plate 604 includes one or more heating elements or other means for heating. The temperature of the plate 604 may be controlled using the user interface 205. A protruding and horizontally extending lip 606 is defined at the lower edge of heating plate 604. Lip 606 extends orthogonally from plate 604. In use, the bottom edge of one or more slides 102 are seated on the lip 606. The angled surface of the heating plate 604 allows water (or other fluid) to run down the slide 102 by gravity, thereby accelerating the slide drying time. The water can collect on lip 219. An insulator 610 is sandwiched between the plate 604 and the angled wall 603 of the housing 602. An electrical connection 612 is defined on the rear wall of the housing 602. Connection 612 is configured to be connected to one of the auxiliary connections 252 on the main unit 200 by a cable or connector, for example, such that the operator and/or computer can control operation of the slide heater 600, via the user interface 205.

It should be understood that incorporating heating plates 216 and 218, slide basket heater 230, plate 270, heating tray 209, probe 212, user interface 205, and auxiliary unit connections 252 into a single unitary station 100 offers a convenient solution to the operator for processing, bathing, heating and storing slides and tissue samples. The auxiliary slide heater 600 and slide basket heater 300 may also be incorporated into station 100, if so desired, or those auxiliary units may be separate (as shown).

It is to be understood that the operational steps described herein are performed by the processor of the main unit upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the processor described herein is implemented in software code or instructions which are tangibly stored on a tangible computer readable medium. Upon loading and executing such software code or instructions by the processor, the processor may perform any of the functionality of the processor described herein, including any steps of the methods described herein.

It is noted that various features, shapes and components of the processing station 100 are ornamental and non-functional and may be protected in one or more design patent applications.

While exemplary embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A tissue processing station comprising:
   a housing;
   a first heated plate either disposed on or forming at least a part of a first horizontally oriented surface of the housing, said first heated plate configured to either (i) contain water or (ii) receive a dish containing water;
   a second heated plate either disposed on or forming at least a part of an angled surface of the housing, said angled surface being angled relative to the first horizontally oriented surface for supporting one or more laboratory slides; and a third heated plate either disposed on or forming at least a part of a second horizontally oriented surface of the housing for supporting one or more laboratory slides, wherein the first and second horizontally oriented surfaces are defined at different elevations on the housing, and wherein the angled surface extends between the two horizontally oriented surfaces.

2. The tissue processing station of claim 1, wherein the first heated plate is disposed within an opening formed on the housing, and the first horizontally oriented surface is recessed within the opening.

3. The tissue processing station of claim 1, further comprising a user interface disposed on the housing, said user interface including at least a display, wherein the user interface is configured to be connected to a computer processor.

4. The tissue processing station of claim 1, further comprising a computer processor, wherein the computer processor is configured to separately activate heating elements on the heated plates, such that the heated plates can be operated independently at different temperatures.

5. The tissue processing station of claim 1, further comprising a fourth heated plate disposed on the second horizontally oriented surface at a location adjacent the third heated plate.

6. The tissue processing station of claim 1, further comprising a slide basket heater positioned within an opening defined on the second horizontally oriented surface, the slide basket heater containing a cavity for receiving a plurality of vertically oriented slides, and one or more heating elements for heating the cavity.

7. The tissue processing station of claim 1, further comprising a lip projecting outwardly from a base surface of the second heated plate.

8. The tissue processing station of claim 1, wherein an obtuse angle is formed between the angled surface and the first horizontally oriented surface.

9. The tissue processing station of claim 1, further comprising one or more electrical connectors for electrically connecting one or more auxiliary units to the station.

10. The tissue processing station of claim 9, wherein one of the auxiliary units is a slide basket heater comprising a housing having a hollow cavity for receiving a plurality of vertically oriented slides, and one or more heating elements for heating the hollow cavity.

11. The tissue processing station of claim 9, wherein one of the auxiliary units is a slide heater comprising a slide heater housing defining an angled surface and a heated plate either disposed on or forming the angled surface of the slide heater housing for supporting and heating one or more laboratory slides.

12. The tissue processing station of claim 1, wherein the second and third heated plates are either (i) connected or abutted against one another and heated to the same temperature, or (ii) disconnected and configured to be heated to different temperatures.

13. A tissue processing station comprising:
a housing;
a first heated plate either disposed on or forming at least a part of a first horizontally oriented surface of the housing, said first heated plate configured to either (i) contain water, or (ii) receive a dish containing water;
a slide basket heater positioned within an opening that is disposed on a second horizontally oriented surface of the housing for supporting one or more laboratory slides, wherein the first and second surfaces are defined at different elevations on the housing, the slide basket heater containing a cavity for receiving a plurality of vertically oriented slides, and one or more heating elements for heating the cavity; and
a second heated plate either disposed on or forming an angled surface of the housing, said angled surface being angled relative to the first horizontally oriented surface for supporting one or more laboratory slides, and wherein the angled surface extends between the first and second horizontally oriented surfaces.

14. The tissue processing station of claim 13, further comprising a third heated plate either disposed on or forming at least a part of the second horizontally oriented surface of the housing for supporting one or more laboratory slides.

15. The tissue processing station of claim 13, further comprising a user interface disposed on the housing, said user interface including at least a display, wherein the user interface is configured to be connected to a computer processor.

16. The tissue processing station of claim 13, further comprising a computer processor, wherein the computer processor is configured to separately activate heating elements on the first heated plate and the slide basket heater.

17. The tissue processing station of claim 13, further comprising one or more electrical connectors for connecting one or more auxiliary units to the station.

18. The tissue processing station of claim 17, wherein one of the auxiliary units is an auxiliary slide basket heater comprising a housing having a hollow auxiliary cavity for receiving a plurality of vertically oriented slides, and one or more heating elements for heating the hollow auxiliary cavity.

19. A tissue processing station comprising:
a housing;
a first heated plate either disposed on or forming at least a part of a first horizontally oriented surface of the housing, said first heated plate configured to either (i) contain water, or (ii) receive a dish containing water;
a slide basket heater positioned within an opening that is disposed on either the first horizontally oriented surface or a second surface of the housing for supporting one or more laboratory slides, the slide basket heater containing a cavity for receiving a plurality of vertically oriented slides, and one or more heating elements for heating the cavity; and
one or more electrical connectors for connecting one or more auxiliary units to the station, wherein one of the auxiliary units is an auxiliary slide heater comprising a slide heater housing defining an angled surface and a heated plate either disposed on or forming the angled surface of the slide heater housing for supporting and heating one or more laboratory slides.

* * * * *